United States Patent [19]
Hadlum

[11] Patent Number: 5,244,219
[45] Date of Patent: Sep. 14, 1993

[54] HAND HELD CARRIER

[75] Inventor: Sidney R. Hadlum, Bromley, England

[73] Assignee: Hadlum Brothers, Ltd., London, England

[21] Appl. No.: 776,384

[22] PCT Filed: May 25, 1990

[86] PCT No.: PCT/GB90/00823

§ 371 Date: Nov. 20, 1991

§ 102(e) Date: Nov. 20, 1991

[87] PCT Pub. No.: WO90/14259

PCT Pub. Date: Nov. 29, 1990

[30] Foreign Application Priority Data

May 25, 1989 [GB] United Kingdom ............... 8912002

[51] Int. Cl.$^5$ ............................................. B62B 1/12
[52] U.S. Cl. .................................. 280/47.26; 280/652
[58] Field of Search .................... 280/47.26, 644, 651, 280/652, 79.2

[56] References Cited

U.S. PATENT DOCUMENTS

| 2,472,203 | 6/1949 | Friedmann et al. | 280/652 |
| 3,178,197 | 4/1965 | Boatner | 280/37 |
| 3,197,225 | 7/1965 | Powell | 280/652 |
| 4,621,404 | 11/1986 | Browning | 280/47.26 |
| 4,848,782 | 7/1989 | Schmidt | 280/47.26 |

FOREIGN PATENT DOCUMENTS

| 65091 | 11/1982 | European Pat. Off. | 280/47.26 |
| 3400956 | 7/1985 | Fed. Rep. of Germany | 280/47.26 |
| 3445478 | 6/1986 | Fed. Rep. of Germany | 280/47.26 |
| 2031718 | 4/1980 | United Kingdom | 383/119 |

Primary Examiner—Eric D. Culbreth
Attorney, Agent, or Firm—Omri M. Behr; Matthew J. McDonald

[57] ABSTRACT

A wheeled hand held carrier suitable for carrying shopping comprises a rigid molded thermoplastic base to which is mounted a pair of wheels. The base has upwardly extending perimetrical sides to which is secured a tubular collapsible upwardly extendable wall at the upper extremity of which are a pair of handles. The wall folds into the base to form a compact easily portable carrier. The wheels are mounted in recesses molded in the base so that the base forms a waterproof bottom to the carrier. A strap is secured to a front side of the base to receive one of the handles when the carrier is collapsed to secure the carrier in the folded state and to provide a handle by which the collapsed carrier may be carried.

9 Claims, 2 Drawing Sheets

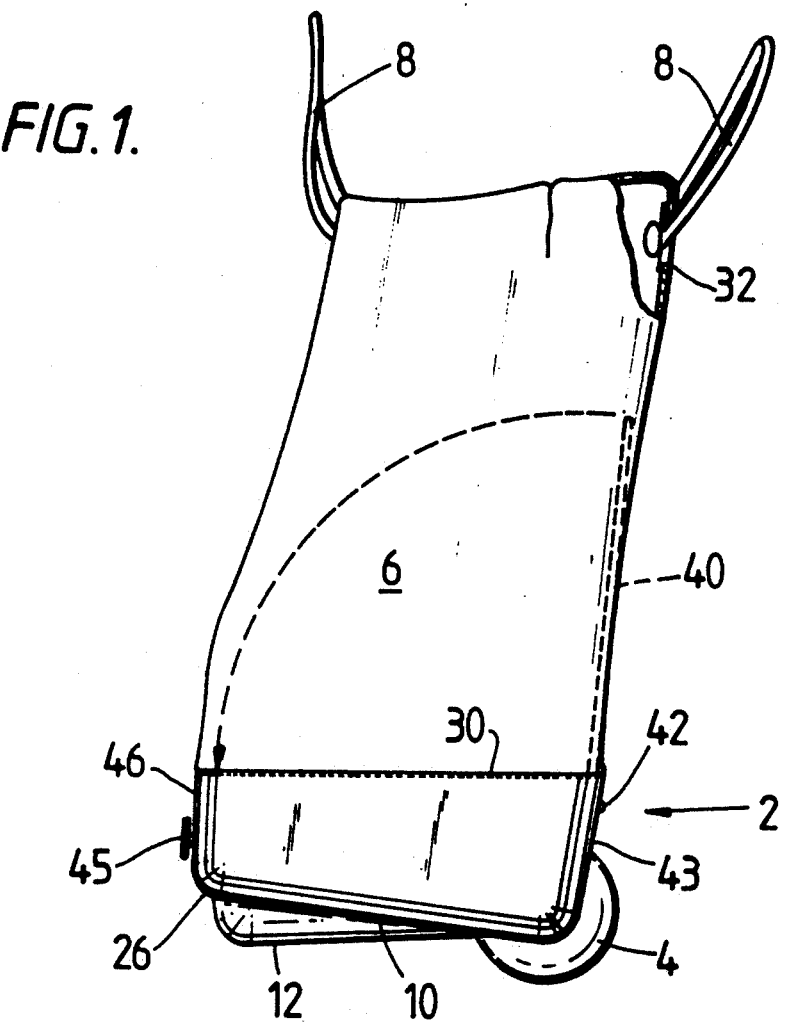
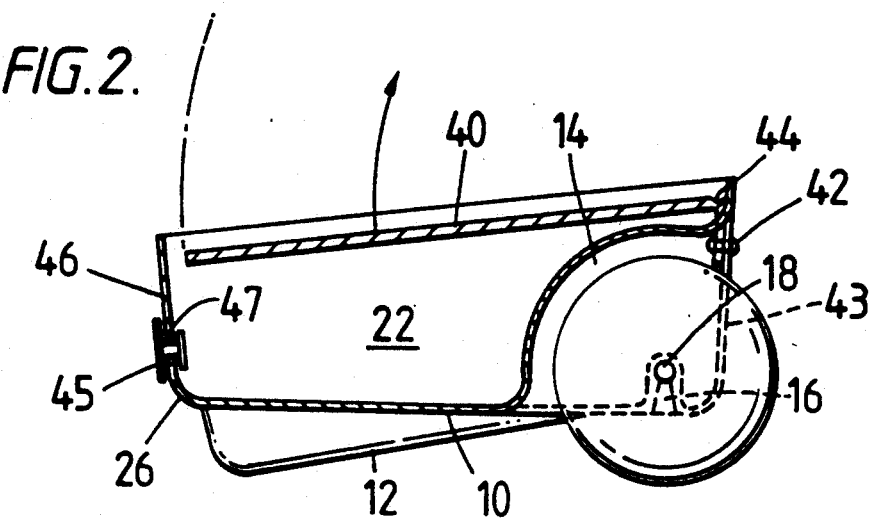

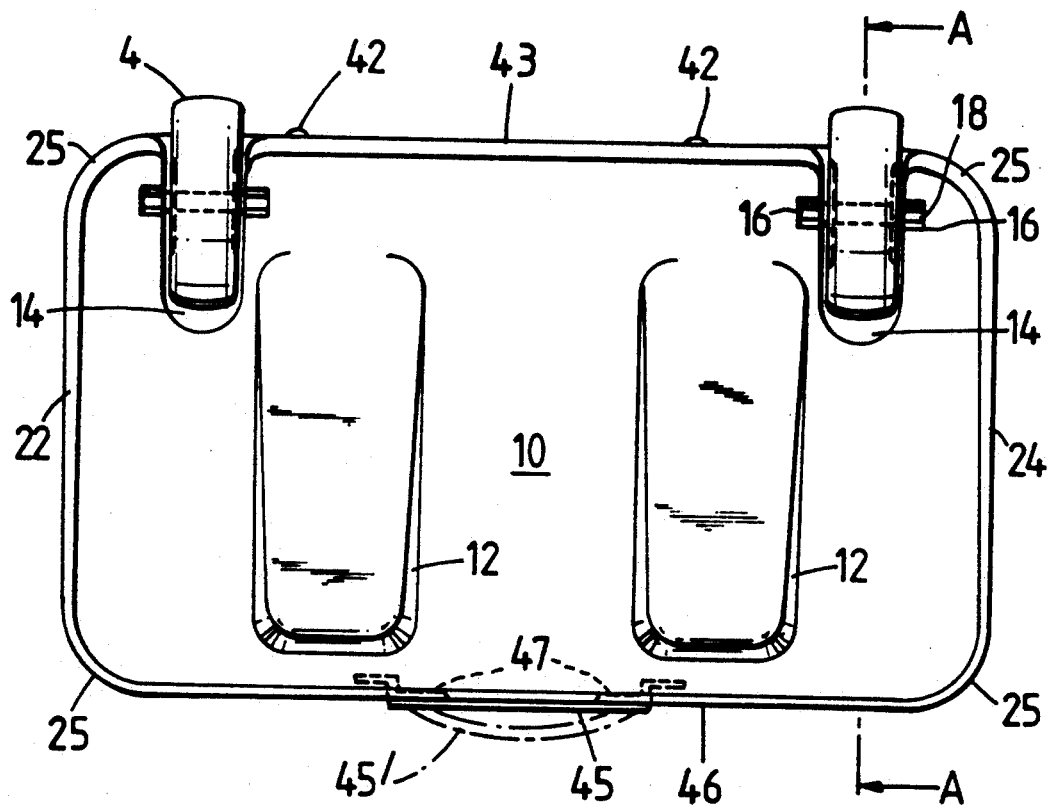
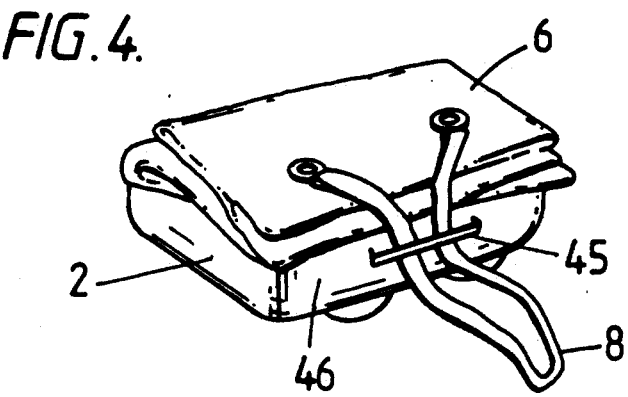

HAND HELD CARRIER

The present invention relates to a wheeled hand held carrier of the kind suitable for but not restricted to carrying shopping.

Shopping trolleys in various forms are well known and comprise a metal frame, frequently made to telescope and have a bag attached or designed to support a removable bag. Whilst attempts have been made to reduce the bulk of the frame, this is nevertheless unwieldy and gets in the way of the shopper when using supermarkets. One reason why this is so is that the shopper needs to use an open supermarket trolley within the supermarket which does not readily accommodate the shopping trolley. To overcome this problem specially designed bags have been produced which fit in the supermarket trolley which on completion of shopping can be lifted out and carried to the shopper's vehicle leaving the supermarket trolley behind. This however leaves the shopper with the problem of carrying a large bulky bag in one hand, so that the shopper soon tires of this aid and merely relies on plastic carrier bags provided by the supermarket.

A wheeled hand held carrier according to the present invention comprises a rigid base to which are fixed wheels, the rigid base having an upwardly extending perimeter to which is secured a tubular collapsible upwardly extendable wall at the upper extremity of which is at least one carrying handle, wherein the rigid base is formed as a moulding recessed in two rear positions to receive in each recess a wheel wherein each wheel is mounted on an axle, each axle being snap fitted at each end into a recess in the rigid base. The very simple construction of the carrier according to the invention provides in simple terms a light collapsible wheeled bag which can be easily placed in the supermarket trolley during shopping and then loaded from the trolley after check out when the carrier is folded. The upwardly extending perimeter is advantageous in enclosing and thus tidying the wall and preventing damage to the wall. Furthermore the wall can be formed as an economically manufactured tube which can be sewn or riveted to the perimeter which is preferably in a rectangular form but with generously curved corners. The two wheels are received one in each of two recesses in the rigid base member of the carrier by means of an axle for each wheel snap fitted at each end in the recess. In this arrangement the simplicity of providing a suitably moulded base into which the wheels mounted on short axles can be easily clipped i.e. releasably attached further reduces assembly costs.

The rigid base may be simply formed as a single plastics moulding recessed in two rear positions to receive in each recess a wheel mounted on an axle which during manufacture can be snap fitted into further recesses within the wheel recess. The rigid base and the tubular wall construction provide an economical product which affords the user a simple, strong and good looking carrier. The construction of the base enables the carrier to be waterproof so that it is suitable for use in situations other than shopping for example as a beach bag or for picnics. The upwardly extending perimeter in this case helps to prevent water soaking into the bottom of the carrier.

An embodiment of the invention will now be described with reference to the accompanying drawings in which:

FIG. 1 is a side elevation view of a carrier according to one embodiment of the present invention, FIG. 2 is a cross section of the base component of the carrier of FIG. 1 taken on lines AA of FIG. 3, FIG. 3 is an underside view of the base of the carrier of FIG. 1, and FIG. 4 is a perspective view showing the carrier in a folded condition.

In FIG. 1 of the drawings there is shown a wheeled carrier having a rigid base 2 with a pair of wheels 4 and sewn to the base is a tubular collapsible upwardly extendable wall 6 at the upper extremity of which are two rope handles 8 formed as loops.

The base is in the form of an open box with a flat base 10 from which depend two ramped stand protrusions 12 which enable the carrier to stand upright. Also in the base are two wheel recesses 14 inside each of which are two keyhole shaped recesses 16 into which the ends of short axles 18 carrying wheels 4 are forced forming a snap fit connection in which the walls of recesses 16 resiliently lock the axles 18 in place.

Extending upwardly from the base are perimetrical sides 22, 24, 43 and 46 which are formed from the same moulding as the base and which meet each other and the base at generously curved side corners 25 and bottom corners 26. The bottom corners 26 are curved to enable the inside of the carrier to be easily cleaned whilst the side corners 25 are so as to enable the wall made of nylon or other suitable relatively stiff yet flexible or otherwise secured e.g. rivets along the tops of the sides at 30.

The wall 6 is formed as a tube that is with an open top and bottom hemmed at the top and normally seamed upwardly. The hemmed upper edge has a stiffener 32 sewn in the hem and then holed to receive the rope handles 8 which may be retained in place by knotting the rope ends. Preferably the wall 6 is reasonably stiff to allow goods to be inserted into the carrier whilst erect, yet easily folded for packing away the carrier. In an alternative construction the handles can be made of the same material as the wall.

In order to strengthen the rear of the wall 6 when the carrier is only partially full it is preferable to provide a hinged board 40 which is riveted by rivets 42 to the rear wall 43 of the base 2. The board is hinged at 44 by means of a simple crease in the thickness of the board. The board 40 is shown in an upward erect position in FIG. 1 and folded in FIG. 2 to a substantially horizontal position within the base.

When folding the wall 6 the dimensions of the base sides 22, 24, 43 and 46 are such as will enclose the wall 6. In order to retain the wall 6 in the folded condition as shown in FIG. 4 a resilient strap 45 is provided on the front side 46 of the upwardly extending perimeter of base 2. The strap 45 is secured to the base 2 by two laterally extending slots 47 (parallel to the flat base 10) which allow the strap to be pulled to an open position at 45' as shown in FIG. 3. The rear of the handles 8 (to the right in FIG. 1) can then be passed between the strap and front side 8 to hold the carrier in the folded condition. The rear handle then becomes the handle for carrying the container in the folded condition.

The simplicity of the carrier is such that manufacture is very economical and few manufacturing steps are needed. The construction is robust yet elegant and the base construction provides a good waterproof base.

I claim:

1. A wheeled hand held carrier comprising a rigid base to which are fixed wheels, the rigid base having an upwardly extending perimeter to which is secured a tubular collapsible upwardly extendable wall at the upper extremity of which is at least one carrying handle wherein the rigid base is formed as a moulding recessed in two rear positions to receive in each recess a different one of said wheels wherein each wheel is mounted on an axle, each axle and the base being dimensioned so that each axle is resiliently snap fitted to the base at each axle end when inserted into a corresponding axle receiving recess in the rigid base, and a strap on a front wall of the upwardly extending perimeter of the rigid base and mounted in slots in the base so as to receive said carrying handle in a folded condition of the carrier.

2. A carrier as claimed in claim 1 wherein each said axle receiving recess is provided on each side of each said wheel receiving recess.

3. A carrier as claimed in claim 1 wherein the rigid base is formed with at least one protrusion at a least one position spaced from the wheels so to enable the carrier to stand upright.

4. A carrier as claimed in claim 1 wherein the rigid base is formed as a single waterproof moulding.

5. A carrier as claimed in claim 1 wherein the extendable wall is formed from flexible material such that in the collapsed state it packs within the rigid base.

6. A carrier as claimed in claim 1 wherein a board is hingedly secured within and to the rear of the rigid base so as to be movable from an upward erect wall reinforcing position to a folded substantially horizontal position within the base.

7. A wheeled hand held carrier comprising:
   a rigid box-like base formed of an integral molded moisture impervious thermoplastic material having a bottom wall and a plurality of upstanding side walls forming a first cavity having an open region facing the ambient atmosphere and juxtaposed with the bottom wall;
   a tubular collapsible member having extended and collapsed states and first and second ends, said first end being secured to the upstanding side walls, said member when extended forming a second cavity which is an extension of the first cavity, said second end being positioned distal the base in the extended state, said member when collapsed, folding into said first cavity;
   at least one handle secured to the member at said second end for permitting the manual pulling of the carrier in the extended state; and
   means secured to the base for receiving the at least one handle when the member is collapsed to secure the collapsed member to the base and such that the one handle can be used for carrying the collapsed carrier.

8. The carrier of claim 7 including a pair of wheels and a corresponding axle for each wheel, said base including means for snap fitting each axle to said base.

9. A wheeled hand held carrier comprising:
   a rigid open box-like base formed of an integral molded moisture impervious thermoplastics material comprising a bottom wall and a plurality of upstanding side walls forming a first cavity having an open region facing the ambient atmosphere and juxtaposed with the bottom wall;
   a tubular collapsible member having extended and collapsed states and first and second ends, said first end being secured to the upstanding side wall, said member when extended forming a second cavity which is an extension of the first cavity, said second end being positioned distal the base in the extended state, said member when collapsed, folding into said first cavity;
   a pair of wheels secured to said base external to and on a side of the base opposite said first cavity;
   at least one handle secured to the member at said second end; and
   means secured to the base for receiving the at least one handle when the member is collapsed so as to secure the member in the collapsed state and for providing a handle for the collapsed carrier.

* * * * *